United States Patent
Landis et al.

(10) Patent No.: US 11,129,116 B2
(45) Date of Patent: Sep. 21, 2021

(54) SYSTEM FOR DETECTING AN OBJECT WITHIN A TRANSMISSION PATH

(71) Applicant: QUALCOMM Incorporated, San Diego, CA (US)

(72) Inventors: Shay Landis, Hod Hasharon (IL); Guy Wolf, Rosh Haayin (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/448,793

(22) Filed: Jun. 21, 2019

(65) Prior Publication Data
US 2020/0404598 A1    Dec. 24, 2020

(51) Int. Cl.
*H04W 52/44* (2009.01)
*H04W 24/08* (2009.01)
*H04W 52/14* (2009.01)
*H04W 88/02* (2009.01)

(52) U.S. Cl.
CPC ........ *H04W 52/44* (2013.01); *H04W 24/08* (2013.01); *H04W 52/146* (2013.01); *H04W 88/02* (2013.01)

(58) Field of Classification Search
CPC .... H04B 1/3838; H04W 52/00–52/60; H04W 52/44; H04W 52/146; H04W 24/08; H04W 88/02
See application file for complete search history.

(56) References Cited

U.S. PATENT DOCUMENTS

| | | |
|---|---|---|
| 4,510,595 A | 4/1985 | Glance et al. |
| 5,231,632 A | 7/1993 | Yamao et al. |
| 5,337,005 A | 8/1994 | Fenk et al. |
| 5,521,600 A | 5/1996 | McEwan et al. |
| 5,640,694 A | 6/1997 | Milton, Jr. |
| 5,983,081 A | 11/1999 | Lehtinen |

(Continued)

FOREIGN PATENT DOCUMENTS

| | | | |
|---|---|---|---|
| EP | 3358495 A1 * | 8/2018 | ......... G06K 9/00496 |
| EP | 3358495 A1 | 8/2018 | |

(Continued)

OTHER PUBLICATIONS

International Search Report and Written Opinion—PCT/US2020/036423—ISAEPO—dated Sep. 16, 2020.

*Primary Examiner* — Raymond S Dean
(74) *Attorney, Agent, or Firm* — Qualcomm Incorporated

(57) ABSTRACT

This disclosure generally relates to systems, devices, apparatuses, products, and methods for wireless communication. For example, a user equipment (UE) device within a wireless communication system may generate an uplink signal. The uplink signal comprises at least one of a physical uplink control channel (PUCCH), a physical uplink shared channel (PUSCH), a physical random access channel (PRACH), or a sounding reference signal (SRS). The UE transmits the uplink signal from the UE, and receives a signal at the UE. The UE performs a correlation between the transmitted uplink signal and the received signal, and determines whether an object is present within a transmission path from the UE based on the correlation. The UE may set a transmission parameter at the UE based on the determination of whether the object is present within the transmission path.

28 Claims, 6 Drawing Sheets

(56) References Cited

U.S. PATENT DOCUMENTS

| | | | |
|---|---|---|---|
| 6,487,219 B1 | 11/2002 | Snider | |
| 7,053,629 B2 * | 5/2006 | Nevermann | G01D 5/48 |
| | | | 324/644 |
| 8,781,420 B2 | 7/2014 | Schlub et al. | |
| 8,781,422 B2 | 7/2014 | Tanii et al. | |
| 8,886,247 B1 * | 11/2014 | Price | H04B 1/3838 |
| | | | 370/318 |
| 9,176,223 B2 | 11/2015 | Derham et al. | |
| 9,179,299 B2 | 11/2015 | Schlub et al. | |
| 9,474,042 B1 | 10/2016 | Wootton et al. | |
| 2002/0003488 A1 | 1/2002 | Levin et al. | |
| 2002/0128052 A1 | 9/2002 | Neagley et al. | |
| 2004/0214598 A1 | 10/2004 | Parameswaran Rajamma | |
| 2005/0242984 A1 | 11/2005 | Waters | |
| 2006/0071790 A1 | 4/2006 | Duron et al. | |
| 2006/0199587 A1 | 9/2006 | Hansen | |
| 2006/0234635 A1 | 10/2006 | Riordan et al. | |
| 2008/0297487 A1 | 12/2008 | Hotelling et al. | |
| 2011/0250928 A1 | 10/2011 | Schlub et al. | |
| 2013/0035051 A1 * | 2/2013 | Mujtaba | H04B 7/0808 |
| | | | 455/277.2 |
| 2013/0172045 A1 | 7/2013 | Caballero et al. | |
| 2014/0064264 A1 | 3/2014 | Morita et al. | |
| 2015/0201385 A1 | 7/2015 | Mercer et al. | |
| 2015/0226837 A1 | 8/2015 | Corcos et al. | |
| 2015/0285906 A1 | 10/2015 | Hooper et al. | |
| 2015/0381269 A1 | 12/2015 | Deyle et al. | |
| 2016/0077196 A1 | 3/2016 | Dehlink et al. | |
| 2016/0178730 A1 | 6/2016 | Trotta et al. | |
| 2016/0282457 A1 | 9/2016 | Mazzaro et al. | |
| 2016/0327634 A1 | 11/2016 | Katz et al. | |
| 2018/0159638 A1 * | 6/2018 | Awadin | H04B 17/17 |
| 2018/0287651 A1 | 10/2018 | Udara et al. | |
| 2018/0368117 A1 * | 12/2018 | Ying | H04L 1/1657 |
| 2018/0375629 A1 * | 12/2018 | Lee | H04J 11/00 |
| 2019/0141692 A1 | 5/2019 | Subramanian et al. | |
| 2019/0200365 A1 * | 6/2019 | Sampath | H04W 52/242 |
| 2019/0289557 A1 * | 9/2019 | Li | H04W 52/283 |
| 2019/0377075 A1 * | 12/2019 | Tsfati | G01S 13/04 |
| 2020/0145090 A1 * | 5/2020 | Sun | H04L 25/0226 |

FOREIGN PATENT DOCUMENTS

| | | |
|---|---|---|
| KR | 20190017615 A | 2/2019 |
| WO | WO-2008058770 A1 | 5/2008 |

\* cited by examiner

SYSTEM FOR DETECTING AN OBJECT WITHIN A TRANSMISSION PATH

TECHNICAL FIELD

This disclosure relates generally to wireless communications, and more specifically, to setting a transmission parameter based on whether an object is detected within a transmission path.

DESCRIPTION OF RELATED TECHNOLOGY

Wireless communications systems are widely deployed to provide various types of communication content such as voice, video, packet data, messaging, broadcast, and other types of content. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes that may simultaneously support communication for multiple communication devices (e.g., user equipment (UP).

Some wireless networks may utilize high frequencies and small wavelengths to provide high data rates. As one example, fifth generation (5G) capable millimeter wave (mmW) devices may communicate using frequencies at or near the extremely high frequency (EHF) spectrum with wavelengths at or near millimeter wavelengths. Although higher-frequency signals provide larger bandwidths to efficiently communicate large amounts of data, these signals may suffer from higher path loss (e.g., path attenuation). To compensate for the higher path loss, transmit power levels may be increased or beamforming may be used to concentrate energy in a particular direction.

The Federal Communications Commission (FCC) has set a maximum permissible exposure (MPE) restriction designed to regulate human exposure to radio frequency waves. MPE restrictions may limit the transmission power used by a transmitting device in certain situations. To meet MPE restrictions (or other absorption or exposure limits), devices are responsible for balancing performance with transmission power and other constraints. This balancing act may be challenging to achieve, especially with devices that have cost, size, and/or other considerations.

SUMMARY

The systems, methods and devices of this disclosure each have several innovative aspects, no single one of which is solely responsible for the desirable attributes disclosed herein. This disclosure generally relates to systems, devices, apparatuses, products, and methods for wireless communication. As one example, the disclosure more specifically relates to systems, devices, apparatuses, products, and methods regarding a user equipment (UE) that sets a transmission parameter based on whether an object is detected within a transmission path. To perform the object detection, the UE generates an uplink signal. The uplink signal comprises at least one of a physical uplink control channel (PUCCH), a physical uplink shared channel (PUSCH), a physical random access channel (PRACH), or a sounding reference signal (SRS). The UE transmits the uplink signal from the UE and receives a signal at the UE. The UE performs a correlation between the transmitted uplink signal and the received signal and determines whether an object is present within a transmission path from the UE based on the correlation. The UE may set a transmission parameter at the UE based on the determination of whether the object is present within the transmission path.

BRIEF DESCRIPTION OF THE DRAWINGS

The system may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
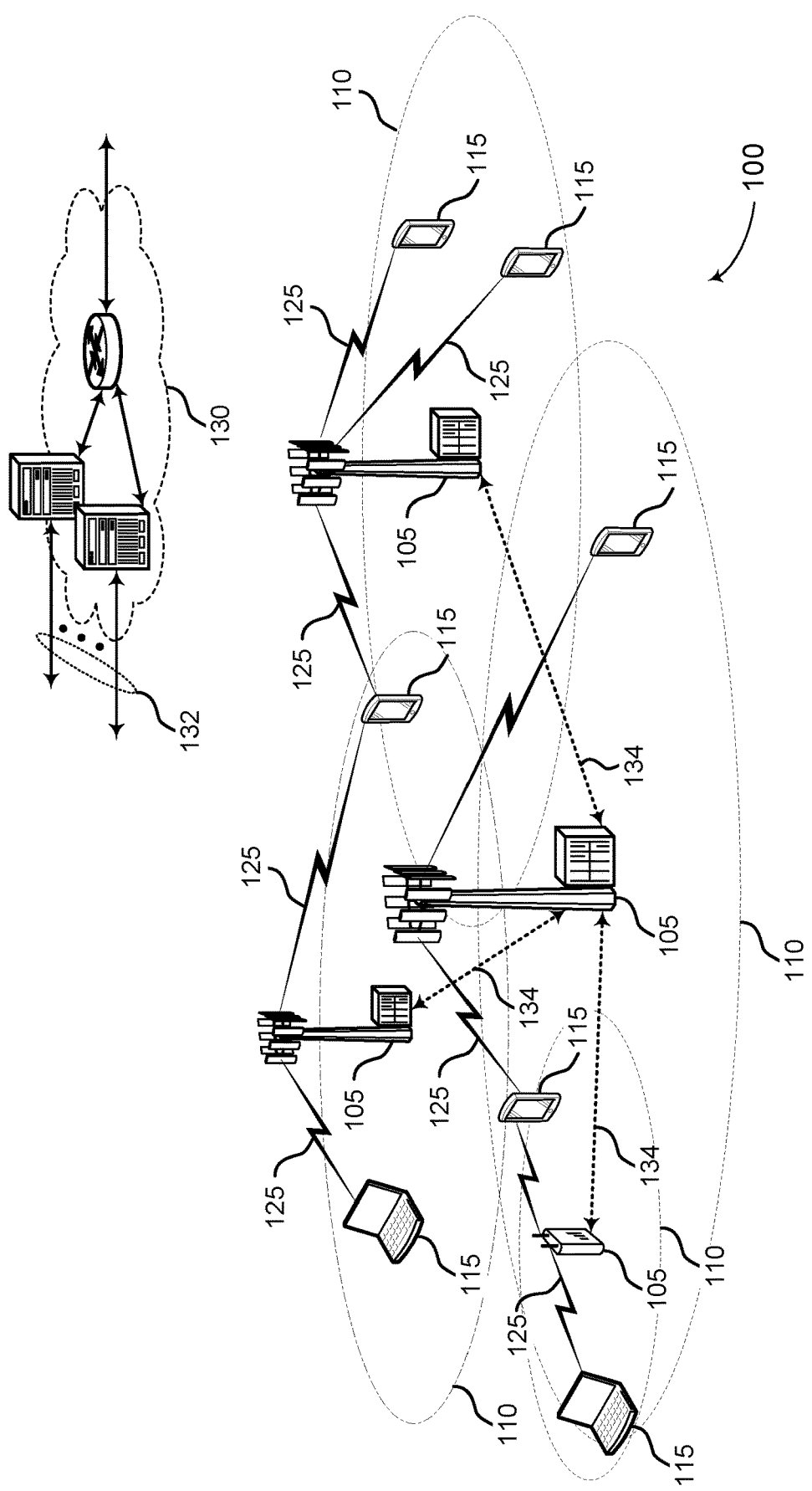
FIG. 1 illustrates an example of a wireless communications system that supports object detection by a wireless communication device in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

The systems and techniques described in this detailed description provide various mechanisms for setting a transmission parameter for a wireless communication device based on whether an object is detected within a transmission path. Many wireless communication devices are physically operated by a human or are otherwise positioned near human tissue during operation. The proximity between a transmitting device and human tissue presents an opportunity for radiation from the device to exceed a human exposure regulation or guideline, such as a maximum permissible exposure (MPE) limit defined by the Federal Communications Commission (FCC) or a specific absorption rate (SAR) limit. Because of these issues, it may be advantageous to enable communication devices to detect whether objects, such as humans, may be within the transmission path of a transmitting device. When an object is determined to be within the transmission path, a transmission parameter (e.g., transmission power) of the device may be set to comply with the relevant exposure regulations. When an object is not detected within the transmission path (or the nearest object is determined to be outside of a threshold range from a transmitting device), the transmission power of the device may be set to a baseline value that is not limited by the exposure regulations. If a device does not employ object detection or proximity detection techniques, then the device may need to assume that a human is located close to the device to ensure compliance with the exposure limits. For example, this assumption of close human proximity may cause the device to always transmit at a low enough power to ensure that the transmission will comply with the exposure regulations regardless of the distance between the transmitting device and the nearest human tissue. Always transmitting in such a low power state may reduce the quality, reliability, or cell coverage related to the communication channel from the transmitting device to another device (e.g., base station) when such low power state is not needed (e.g., when there is no human tissue near the transmitting device).

Some object proximity detection techniques may use a dedicated sensor to detect whether an object is within a certain proximity of the transmitting device. For example, the device may use a camera, an infrared sensor, or a radar sensor. However, these sensors may be bulky and expensive. Furthermore, a single electronic device may include multiple antennas or antenna arrays that are positioned on or near different surfaces of the device (e.g., on a top surface of the device, a bottom surface of the device, or on any side of the device). To account for each of these possible antenna placements, multiple cameras or sensors may need to be installed near each of these antenna locations, which further increases a cost and size of the electronic device.

Other object proximity detection techniques may try to detect objects by transmitting special waveforms when no data is to be transmitted. For example, some systems may transmit a frequency-modulated continuous wave (FMCW, such as a chirp signal) waveform or a multi-tone waveform for proximity detection. These special waveforms may have a continuous transmission power, may vary in frequency over time, and may include multiple tones (e.g., multiple portions of the waveform with different frequencies). By analyzing reflections from either of these special waveforms, a range (e.g., distance) to a detected object may be determined. However, the use of these special waveforms for object detection may present other issues. First, the special waveforms may only be transmitted for object detection purposes and not for communicating with another device (e.g., a base station), thus introducing unnecessary overhead and noise to the overall system. Second, the special waveforms are sent at times when no waveform would otherwise be transmitted in the system, thus introducing unnecessary power drain at the transmitting device. Third, these special waveforms may only be transmitted at certain scheduling opportunities, such as during a scheduled random access channel (RACH) opportunity, thus making the resulting object detection opportunities unnecessarily infrequent. Fourth, these special waveforms are not defined by the relevant signal standardization groups (e.g., third generation partnership project (3GPP) or other governing standards body), thus causing these special waveforms to be transmitted at a limited power to meet out-of-band (OOB) specifications that govern these types of non-standardized signals.

The systems and techniques described in this detailed description provide various mechanisms for detecting whether an object is present within a transmission path through use of traditional uplink waveforms, such as uplink waveforms defined by the 3GPP standard (e.g., 3G, 4G LTE, 5G NR, or future standards beyond 5G NR). For example, the system may transmit a physical uplink shared channel (PUSCH), a physical uplink control channel (PUCCH), a physical random access channel (PRACH), or a sounding reference signal (SRS), and then detect an object based on receiving a reflected version of the PUSCH, PUCCH, PRACH, or SRS.

A PUSCH carries uplink user data to another device, such as a base station. In addition to the uplink user data, the PUSCH may also optionally carry one or more radio resource control (RRC) signaling messages and uplink control information (UCI). The control information may be multiplexed with the user data and may include MIMO related parameters or transport format indicators.

A PUCCH carries uplink control information (UCI) to another device, such as a base station. For example, the PUCCH may be used to transport one or more of hybrid automatic repeat request (HARQ) feedback, channel state information (CSI), channel quality indicators (CQI), MIMO feedback, or scheduling requests (SR). The PUCCH may be configured in one of multiple different formats (including long and short PUCCH formats), with the long PUCCH carrying more than two bits of UCI payload and short PUCCH carrying two or less bits of UCI payload. The number of OFDM symbols used for PUCCH may also vary depending on the PUCCH format selected.

A PRACH represents a random access request. The PRACH is used to carry a random access preamble from the UE towards the base station. PRACH may be used by the base station to adjust uplink timings of the UE in addition to other parameters. The PRACH may include one or more predefined sequences, such as Zadoff-Chu sequences. The sequence length of the PRACH may be fixed, or may vary depending on the PRACH format chosen. For example, the PRACH may have a long format (larger sequence length) or a short format (shorter sequence length) depending on the deployment scenario of the system.

An SRS is an uplink sounding reference signal that may be transmitted by the UE to help the base station obtain channel state information (CSI) for each user. CSI describes how a signal propagates from the UE to the base station and represents the combined effect of scattering, fading, and power decay with distance. The system may use the SRS for resource scheduling, link adaptation, MIMO management, and beam management. The SRS may include one or more predefined sequences, such as Zadoff-Chu sequences.

By using these traditional standardized (e.g., 3GPP defined) uplink waveforms for object detection instead of a special waveform (e.g., FMCW), the object detection system may experience one or more advantages.

First, in some implementations, using the 3GPP defined uplink waveforms for object detection may allow for more frequent object detection opportunities. For example, instead of limiting object detection to defined special transmission opportunities (e.g., only during a random access channel (RACH) opportunity), the system may perform object detection on any uplink transmission opportunity, which occur more frequently than RACH-only opportunities. Second, in some implementations, by performing object detection based on signals that are already planned to be sent for other non-object-detection purposes (e.g., a signal intended to be received and processed by another communication partner, such as a base station), the system does not add the additional transmission overhead that would be associated with transmitting special waveforms dedicated for object detection purposes. Third, in some implementations, performing object detection based on signals that are already planned to be sent for other purposes may avoid introducing extra noise associated with the special waveforms dedicated for object detection purposes. Fourth, in some implementations, performing object detection based on signals that are already planned to be sent for other non-object-detection purposes, the system may avoid draining extra power from the device to transmit both uplink communication signals as well as the extra waveforms dedicated for object detection purposes. Fifth, in some implementations, due to OOB specifications, the 3GPP defined uplink waveforms may be transmitted at a higher power than special waveforms such as FMCW, thus improving object detection and overall system performance. Sixth, the 3GPP defined uplink waveforms may have smaller bandwidth needs than a wideband FMCW signal, while still having enough bandwidth to provide sufficient accuracy for detecting a closest object to the transmitting UE. More details regarding the disclosed object detection and proximity estimation features and benefits will be described in more detail below.

FIG. 1 illustrates an example of a wireless communications system 100 that supports object detection by a wireless communication device (e.g., a UE) in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, a fifth generation (5G) New Radio (NR) network, or another type of network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the device may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some systems, millimeter wave (mmW) communications may occur in a frequency range (also known as "FR2") that exists above 24 GHz (which may include portions of the total frequency range that are within the millimeter band as well as near the millimeter band). In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In the wireless communications system 100, one or more of the UEs 115 may be configured to detect whether an object is present within one or more of its communication paths (e.g., on or along one of the communication links 125). For example, a human or a portion of a human (e.g., a hand or other body part) may be located within a communication path used for uplink communication from a UE 115 to a base station 105. In one implementation, the UE 115 detects the presence and/or proximity of an object based on transmitting an uplink signal that comprises at least one of a PUSCH, PUCCH, PRACH, or SRS, receiving a reflected version of the transmitted signal (e.g., when an object is present within the communication path), and processing the received signal. The UE 115 may also set one or more communication parameters based on the outcome of the object detection/proximity assessment.

Figure 2:
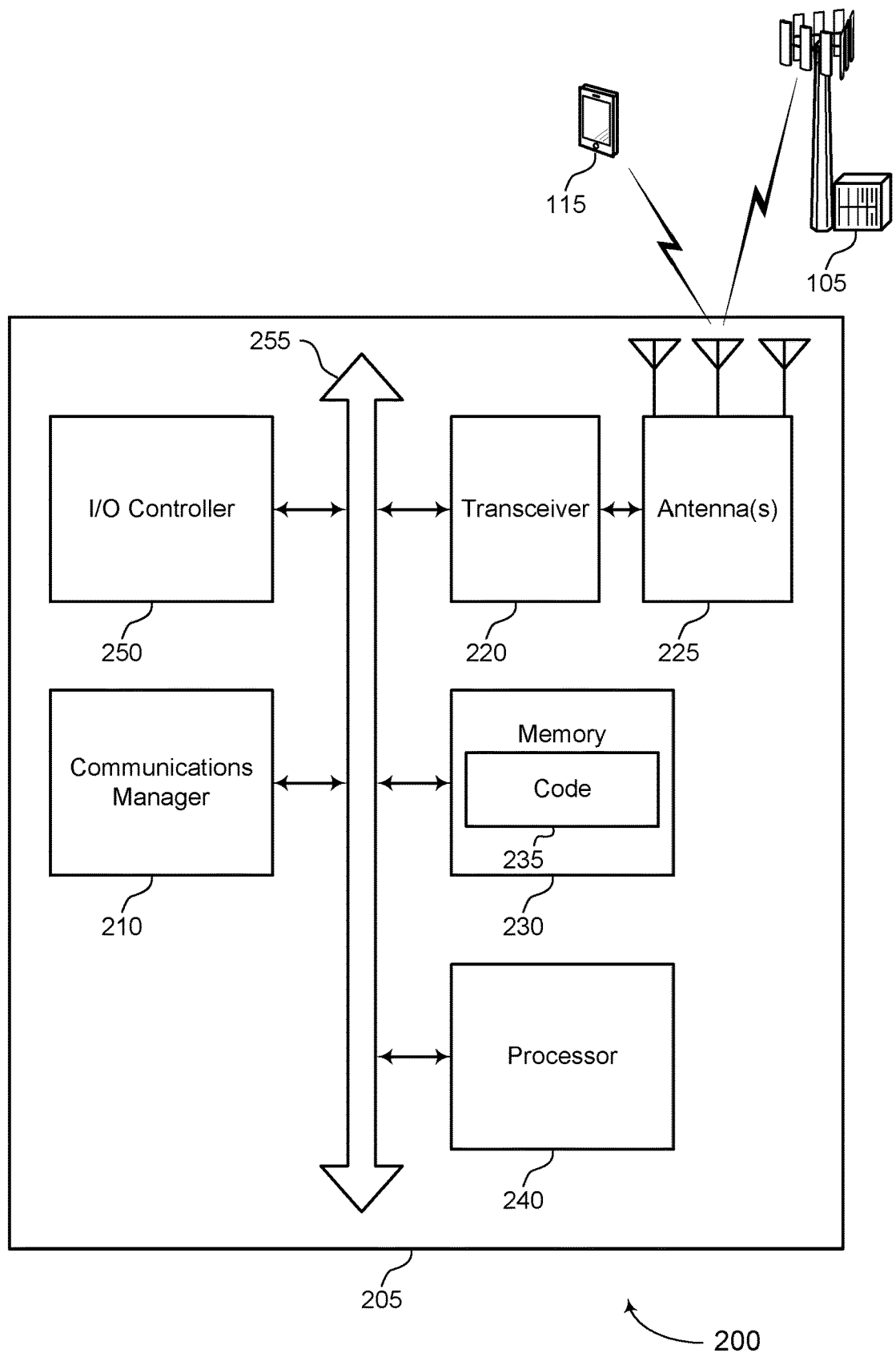
FIG. 2 is a diagram of a wireless communication device configured to detect whether an object is present within a communication path.

FIG. 2 is a diagram of a system 200 including a device 205 that is configured to detect whether an object is present within a communication path in accordance with aspects of the present disclosure. The device 205 may be an example of a UE 115 as described in connection with FIG. 1. The device 205 may include components for bi-directional voice and data communications including components for transmitting and receiving communications, including one or more communications managers 210, one or more transceivers 220, one or more antennas 225, one or more memory devices 230, one or more processors 240, and one or more I/O controllers 250. These components may be in electronic communication via one or more buses (e.g., bus 255).

The communications manager 210 may manage the process of generating signals, transmitting signals, receiving signals, and processing the received signals. The communications manager 210 may work in connection with other components of device 205 (e.g., the processor 240) to perform the various communication functions described herein. When operating as part of an object detection system at device 205, the communications manager 210 may manage the processes of generating an uplink signal (e.g., a PUSCH, PUCCH, PRACH, or SRS) and providing the uplink signal to the transceiver 220 for transmission to another device (e.g., a base station). The communications manager 210 may also manage the processes of the device 205 receiving a reflected version of the transmitted signal (e.g., when an object is present within the communication path) and processing the received signal for object detection purposes. The communications manager 210 may also manage the process of setting a communication parameter for the device 205 based on the object detection result. The communications manager 210 may comprise its own processor or may be a functional component of processor 240.

Transceiver 220 may communicate bi-directionally, via one or more antennas (e.g., antennas 225). For example, the transceiver 220 may represent a wireless transceiver and may communicate bi-directionally with another wireless transceiver. The transceiver 220 may also include a modem to modulate the packets and provide the modulated packets to the antennas for transmission, and to demodulate packets received from the antennas. When operating as part of an object detection system at device 205, the transceiver 220 may transmit an uplink signal that comprises at least one of a PUSCH, PUCCH, PRACH, or SRS. The transceiver 220 may also receive a reflected version of the transmitted signal (e.g., when an object is present within the communication path). The transceiver may then send the received signal to another component (e.g., the processor 240) for further object detection processing.

In some cases, the wireless device 205 may include a single antenna 225 (e.g., antenna array). However, in some cases, the device 205 may have more than one antenna 225 (e.g., multiple antenna arrays), which may be capable of concurrently transmitting or receiving multiple wireless transmissions. When operating as part of an object detection system at device 205, the antenna 225 may produce radio waves that correspond to the content of an uplink signal (e.g., a signal that comprises at least one of a PUSCH, PUCCH, PRACH, or SRS) generated by the device 205. The antenna 220 may also receive a reflected version of the transmitted signal (e.g., when an object is present within the communication path) and pass the received signal to the transceiver 220 for further object detection processing.

The memory 230 may include RAM, ROM, or a combination thereof. The memory 230 may store computer-readable code 235 including instructions that, when executed by a processor (e.g., the processor 240 or another processor in the device 205, such as a processor associated with the transceiver 220, modem, or communication manager 210) to cause the device 205 to perform various communication functions described herein. In some cases, the memory 230 may contain, among other things, a BIOS which may control basic hardware or software operation such as the interaction with peripheral components or devices. The memory 230 may also include instructions to cause the device 205 to perform the object detection features described herein.

The processor 240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 240 may be configured to operate a memory array using a memory controller. In other cases, a memory controller may be integrated into the processor 240. The processor 240 may be configured to execute computer-readable instructions stored in a memory (e.g., the memory 230) to cause the device 205 to perform various functions (e.g., functions or tasks supporting the detection of whether an object is present within a communication path, and setting one or more communication parameters based on the object detection result).

The I/O controller 250 may manage input and output signals for the device 205. The I/O controller 250 may also manage peripherals not integrated into the device 205. In some cases, the I/O controller 250 may represent a physical connection or port to an external peripheral. In some cases, the I/O controller 250 may utilize an operating system such as iOS®, ANDROID®, MS-DOS®, MS-WINDOWS®, OS/2®, UNIX®, LINUX®, or another known operating system. In other cases, the I/O controller 250 may represent or interact with a modem, a keyboard, a mouse, a touchscreen, or a similar device. In some cases, the I/O controller 250 may be implemented as part of a processor. In some cases, a user may interact with the device 205 via the I/O controller 250 or via hardware components controlled by the I/O controller 250.

The code 235 may include instructions to implement aspects of the present disclosure, including instructions to support wireless communications. The code 235 may be stored in a non-transitory computer-readable medium such as system memory or other type of memory. In some cases, the code 235 may not be directly executable by the processor 240 but may cause a computer (e.g., when compiled and executed) to perform functions described herein.

The components illustrated in FIG. 2 may be combined together into a smaller number of components, or the functions described herein may be split into a greater number of components. As one example, regarding the ability to combine functions, the functions of the I/O controller 250 and/or the functions of the communication manager 210 may be consolidated together with other control and processing functions and performed by the processor 240 (based on instructions stored in memory 230). Thus, the configuration shown in FIG. 2 represents one example configuration and additional structural configurations are intended to be within the scope of the present disclosure.

Figure 3:
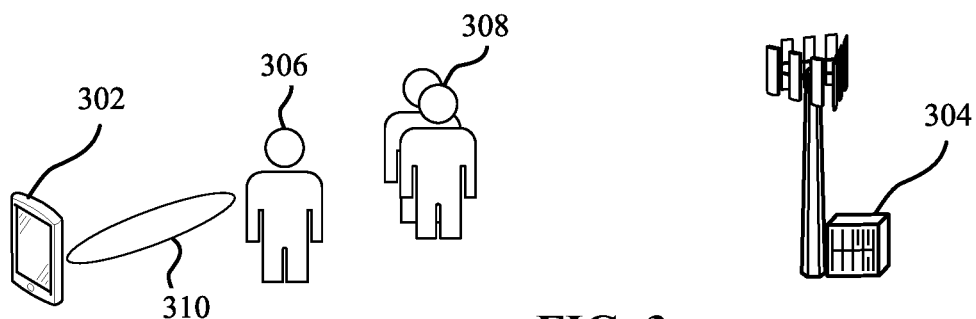
FIG. 3 illustrates one or more objects within a transmission path between wireless communication devices.

FIG. 3 illustrates one or more objects within a transmission path between wireless communication devices. In the example of FIG. 3, a UE 302 sends an uplink signal on transmission path 310 intended for reception at a base station 304. The uplink signal may be a millimeter wave (mmW) signal transmitted on a beam directed to the base station 304. One or more objects 306 and 308 (e.g., humans or other objects, either living or non-living objects) may be located within the transmission path 310 between the UE 302 and the base station 304. MPE or other exposure requirements may limit the transmission power from UE 302 when a human body is within the transmission path 310.

Regulations for MPE are specified by industry, government, and safety organizations. Different wavelengths or categories of electromagnetic radiation have different metrics and thresholds allowed under these regulations. The exposure metric for mmW radiation is defined in terms of power density. Compliance with MPE requirements and the amount of exposure experienced by an object depends on the transmission power used at the transmitting device and the distance between the object and the device (among other variables). Thus, when determining a desired transmission power to use from a transmitting device, in some implementations it may be beneficial for the transmitting device to know the distance from the UE (or a component of the UE, such as the transmitting antenna) to an object closest to the UE in the transmission path. This information may assist the UE to set a transmission power level for a planned transmission that may both comply with MPE restrictions and also meet certain communication performance goals.

In the example of FIG. 3, the UE 302 may want to know the distance between the UE and the closest object within the transmission path 310 (here, human 306). The UE 302 may use this distance to calculate a transmission power that would comply with any MPE limits. Because the UE 302 will set its transmission power based on the distance to the closest object (human 306), the distance to further objects (humans 308) may not be as relevant to setting the desired transmission power level based on MPE compliance. In most situations, due to propagation losses as a radio wave passes through the air, the radiation levels experienced at the further objects will often be less than the radiation levels experienced at the closest object. Thus, if the UE 302 sets a transmission power to ensure MPE compliance with respect to the closest object (human 306), then MPE compliance for the further objects (humans 308) is also likely.

Figure 4:
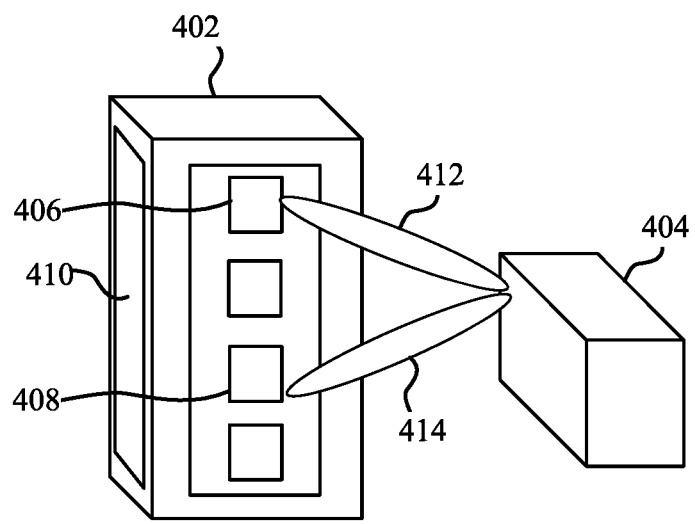
FIG. 4 illustrates a device with a first antenna transmitting a signal and a second antenna receiving a reflected version of the transmitted signal.

FIG. 4 illustrates a device 402 with a first antenna 406 transmitting a signal and a second antenna 408 receiving a reflected version of the transmitted signal. The antennas 406 and 408 may each be individual dipole antennas, each be individual patch antennas, or a mix of multiple antenna types (e.g., some patch, some dipole). Additionally, or alternatively, the antennas 406 and 408 may each be a separate antenna array including multiple individual antennas within each of antenna 406 and antenna 408. The device 402 may also include other antennas 410, such as additional individual antennas or antenna arrays. The other antennas 410 may be positioned on different surfaces of the device 402 to provide other transmission path options in different directions (as compared to the antennas 406 and 408). In the example of FIG. 4, the device 402 transmits the signal from antenna 406 on transmission path 412, which encounters object 404 within the transmission path 412. Object 404 reflects at least a portion of the transmitted signal back towards the device 402 on reflection path 414. The reflected signal is received at antenna 408. Based on the time of the signal transmission and the time of the reflected signal reception (assuming the received signal is confirmed to be a reflected version of the transmitted signal), the device 402 may determine the presence of the object within the transmission path 412 and also may estimate a distance between the device 402 (or a component of the device 402, such as a transmission antenna) and the object 404.

Figure 5:
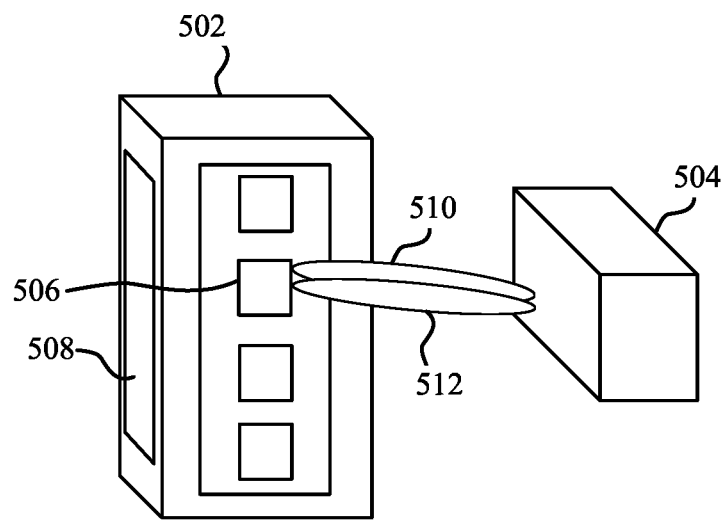
FIG. 5 illustrates a device with an antenna transmitting a signal and the same antenna receiving a reflected version of the transmitted signal.

FIG. 5 illustrates a device 502 with an antenna 506 transmitting a signal and the same antenna 506 receiving a reflected version of the transmitted signal. Like the antennas discussed above in connection with FIG. 4, the antenna 506 may be an individual dipole antenna, an individual patch antenna, or an antenna array of multiple individual antennas. The device 502 may also include other antennas 508, such as additional individual antennas or antenna arrays. In the example of FIG. 5, the device 502 transmits the signal on transmission path 510, which encounters object 504 within the transmission path 510. Object 504 reflects at least a portion of the transmitted signal back towards the device 502 on reflection path 512. The reflected signal is received at antenna 506, which is the same antenna that transmitted the original signal. In some implementations, when the device 502 receives the reflected signal on the same antenna (e.g., antenna array) that transmitted the original signal, the device 502 applies a non-linear interference cancellation process (or another self-interference canceling process) to reduce interference from the transmission when doing the reception of the reflected signal on the same antenna. After the received signal is identified, then the device 502 may determine the presence of the object within the transmission path 412, and also may estimate a distance between the device 402 and the object 404, based on the time of the signal transmission and the time of the reflected signal reception (assuming the received signal is confirmed to be a reflected version of the transmitted signal).

Figure 6:
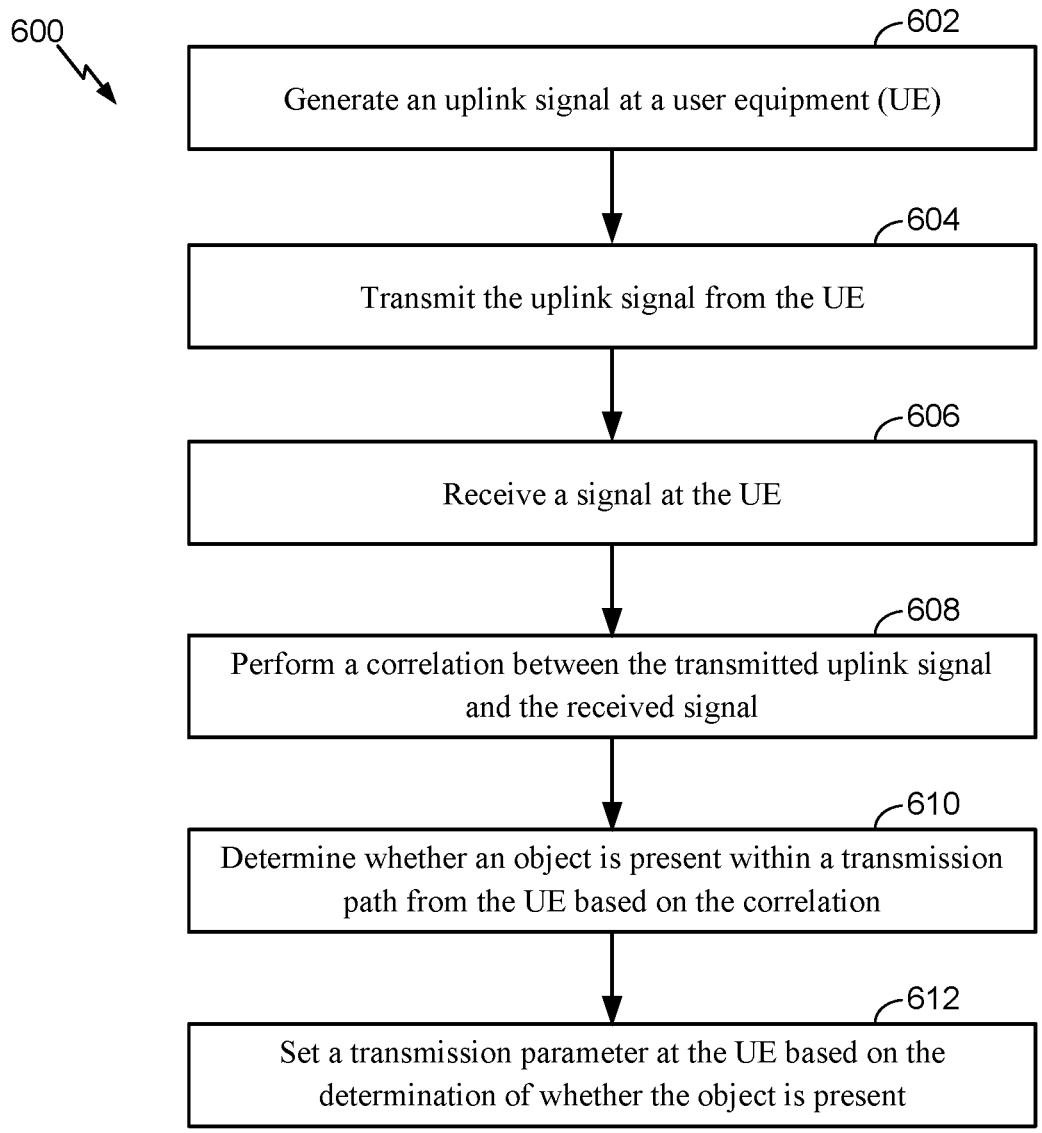
FIG. 6 is a flow diagram illustrating one example of a technique for detecting whether an object is present within a transmission path from a UE.

FIG. 6 is a flow diagram illustrating one example of a process 600 for detecting whether an object is present within a transmission path from a UE. The process 600 may be performed by a wireless communication device, such as a UE (e.g., UE 115 of FIG. 1, device 205 of FIG. 2, device 302 of FIG. 3, device 402 of FIG. 4, or device 502 of FIG. 5). In some implementations, the features in the steps shown in process 600 may performed by one or more components of device 205 as described in FIG. 2. For example, the processing steps of process 600 may be performed by the processor 240 coupled with a memory that includes instructions executable by the processor to cause the apparatus (e.g., UE) to perform the recited processing step. As another example, the transmission and reception steps may be performed by a combination of one or more of the processor 240, transceiver 220, and antenna 225 (among other components along the transmit and receive radio frequency chains of the device).

At step 602, the UE generates an uplink signal. The uplink signal may contain uplink user data, uplink control information, or uplink signaling. The uplink signal may be a signal defined by a standards-setting organization, such as 3GPP. For example, the uplink signal may comprise at least one of a physical uplink control channel (PUCCH), a physical uplink shared channel (PUSCH), a physical random access channel (PRACH), or a sounding reference signal (SRS). The UE may use any individual one of these defined signal types to perform object detection. For example, the UE may select to perform object detection only on PUSCH transmission opportunities (or only PUCCH transmission opportunities, or only on PRACH transmission opportunities, or only on SRS transmission opportunities). Alternatively, the UE may use multiple different signal types, or all of these defined signal types, to perform object detection. For example, the UE may perform object detection on all uplink PUSCH, PUCCH, PRACH, and SRS transmission opportunities (or any subset of transmission opportunities thereof).

At step 604, the UE transmits the uplink signal. In some implementations, the uplink signal is a mmW signal transmitted on a beam directed from an antenna or antenna array of the UE to another device, such as a base station. In other implementations, the uplink signal is transmitted in a non-mmW frequency range.

At step 606, the UE receives a signal. When an object is located within the transmission path that the UE used for the signal transmitted at step 604, then the signal received at the UE at step 606 may be a reflected version of the PUCCH, PUSCH, PRACH, or SRS transmitted from the UE at step 604. In one implementation, the antenna or antenna array that receives the signal at step 606 is the same antenna or antenna array that transmitted the uplink signal at step 604 (e.g., as shown in FIG. 5). In another implementation, the antenna or antenna array that receives the signal at step 606 is a different antenna or antenna array than the antenna or antenna array that transmitted the uplink signal at step 604 (e.g., as shown in FIG. 4).

At step 608, the UE performs a correlation between the transmitted uplink signal and the received signal. For example, the UE may perform the correlation by determining that the received signal is a reflected version of the transmitted uplink signal based on a comparison between a correlation threshold and a degree of correlation between the transmitted uplink signal and the received signal. To perform the correlation, the UE may compare the received signal to the known transmitted signal and quantify the degree of similarity between the two signals. In one example, the correlation analysis may calculate a correlation value between zero and one (or between zero and one hundred, or any other desired range) with a value of zero indicating no correlation and a value of one indicating complete correlation between the two signals. The UE may compare the correlation value against with a correlation threshold, such as a constant false alarm rate (CFAR) threshold. If the correlation value exceeds the threshold, then the UE will treat the received signal as a reflected version of the transmitted signal for object detection and proximity analysis. If the correlation value is below the threshold, then the UE will not treat the received signal as a reflected version of the transmitted signal.

At step 610, the UE determines whether an object is present within a transmission path from the UE based on the correlation. In some implementations, the UE determines that an object is present within the transmission path when the UE receives a signal that is determined to be a reflected version of the signal transmitted at step 604. The determination of whether the object is present may also be based on an amount of time between the transmission of step 604 and the reception at step 606. The UE may compare the amount of time to a self-interference threshold. If the amount of time is below the self-interference threshold, then the UE may disregard the received signal as likely being received directly from the transmitting antenna without any reflection off another object. For example, one antenna may receive a side lobe of the transmitted signal from a different antenna. Due to the short amount of time that would be measured between the transmission and reception, the UE may ignore the signal as interference and not treat it as a reflected signal for object detection purposes. The UE may also compare the amount of time between transmission and reception to a time threshold that would indicate a far distance between the transmitting UE and the object that caused the signal reflection. If the amount of time is greater than the time threshold associated with the far distance, then the UE may determine that although an object may be located somewhere in the transmission path, it is too far from the UE to impact the UE's process for setting transmission parameters to comply with MPE or other exposure limits. For example, if the distance between the UE and the object is above a predetermined level, the UE may determine that even a transmission at the maximum power level would not violate the MPE or other exposure limits and thus does not need to adjust any transmission parameters on behalf of the object detection. As discussed above, in connection with FIG. 3, the UE in step 610 is checking for a closest object to the UE and may not be concerned with other objects that are further away from the UE.

At step 612, the UE sets a transmission parameter based on the determination of whether the object is present within the transmission path. As one example, the UE may set the transmission parameter by setting a transmission power level at the UE based on the determination of whether the object is present within the transmission path. The first transmitted signal may be a millimeter wave signal transmitted on a beam from an antenna or antenna array of the UE. The UE may set the transmission parameter by selecting a transmission power level for a second millimeter wave signal to be transmitted on the beam from the antenna or antenna array based on an exposure limit, such as a maximum permissible exposure (MPE) limit, and a determination that the object is present within the transmission path. As another example, the UE may set the transmission parameter by selecting a second transmission path, different than the first transmission path associated with the detected object, for a next transmission from the UE based on a determination that the object is present within the first transmission path. For example, the UE may choose to use a different transmission beam to avoid the object when the object within the original transmission beam would require too low of transmission power (due to MPE) or impact the quality or reliability of the intended communication on the original selected beam to the base station.

Figure 7:
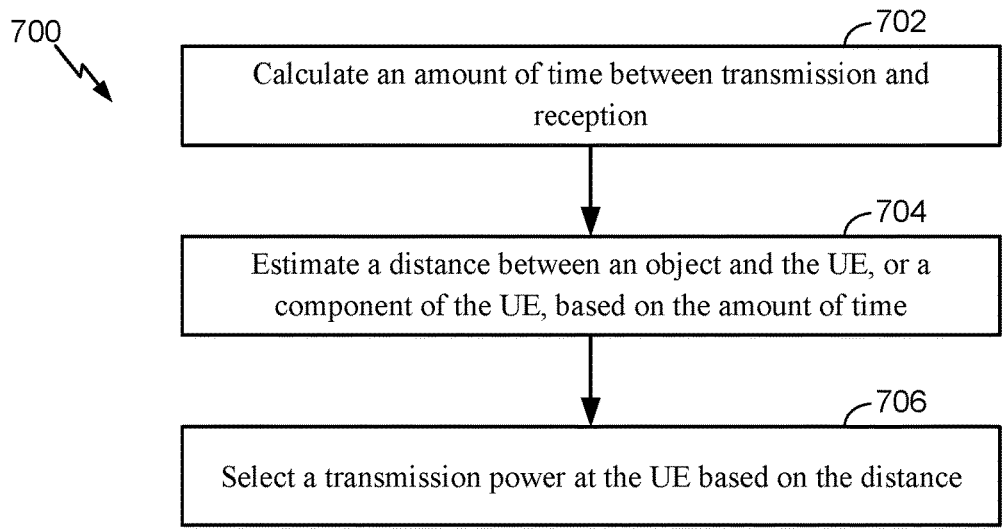
FIG. 7 is a flow diagram illustrating one example of a technique for estimating a distance between a UE and an object within a transmission path from the UE.

FIG. 7 is a flow diagram illustrating one example of a process 700 for estimating a distance between a UE and an object within a transmission path from the UE. The process 700 may be performed by a wireless communication device, such as a UE (e.g., UE 115 of FIG. 1, device 205 of FIG. 2, device 302 of FIG. 3, device 402 of FIG. 4, or device 502 of FIG. 5). In some implementations, the features in the steps shown in process 700 may performed by one or more components of device 205 as described in FIG. 2. For example, each of the steps of process 700 may be performed by the processor 240 coupled with a memory that includes instructions executable by the processor to cause the apparatus (e.g., UE) to perform the recited processing steps. The process 700 of FIG. 7 may be a sub-portion of steps 610 and 612 of FIG. 6 where the UE determines whether an object is present within a transmission path from the UE and sets a communication parameter accordingly. For example, the distance estimation features of process 700 may be performed as a part of, or in combination with, the object detection features of step 610, and the power setting features of process 700 may be performed as a part of, or in combination with, the parameter setting features of step 612.

At step 702, the UE calculates an amount of time between the signal transmission in step 604 (FIG. 6) and signal reception in step 606 (FIG. 6). The amount of time may be calculated based on a timer running at the UE that starts when the signal is transmitted and stops when the reflected signal is received. Alternatively, the amount of time may be calculated based on comparing time stamps associated with transmission and reception.

At step 704, the UE estimates a distance between the object and the UE, or a component of the UE, based on an amount of time between the transmission of the uplink signal and the reception of the received signal. For this estimation, the UE may determine the estimated distance based on the calculated amount of time and the speed of light. For example, in some implementations, the distance may be estimated as one-half of the calculated amount of time (due to the amount of time being a round trip time) multiplied by the speed of light. Other implementations may consider other factors (such as angle of arrival, angle of departure, transmission lag time after a timer starts, reception lag time before the timer ends, a different signal propagation speed that differs from the speed of light, or other factors) to get a finer resolution on the distance estimation.

At step 706, the UE selects a transmission power level for a second uplink signal based on the distance calculated at step 704. Setting the transmission power level at step 706 based on the estimated distance may be one example of setting a communication parameter based on the object detection process described as a part of step 612 of FIG. 6. A UE may use the distance calculation to ensure compliance with MPE limits while still allowing for a higher power transmission when the distance calculation indicates that any object is far enough away to increase power even in view of MPE limits. The selected power level may range, depending on the calculated distance to a nearest object, from a minimum power level that ensures compliance with MPE regardless of the distance, to a maximum power level that could be used when MPE is not triggered. The UE may select any transmission power level within this range as a function of the distance calculation. One example process for selecting a transmission power level is described below in connection with FIG. 8. Other power setting options may also be used in other implementations.

Figure 8:
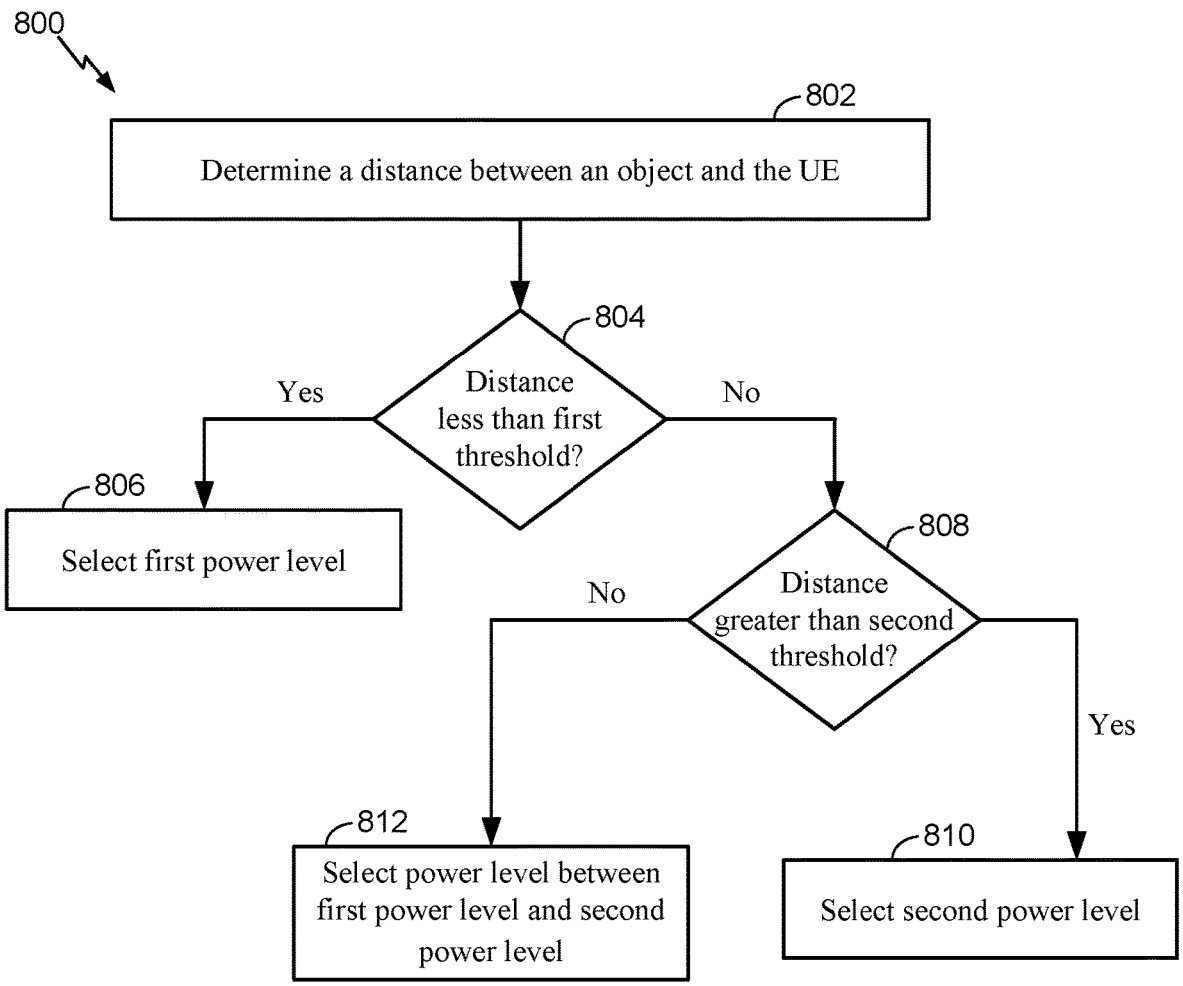
FIG. 8 is a flow diagram illustrating one example of a technique for selecting a transmission power level based on a distance between a UE and an object within a transmission path from the UE.

FIG. 8 is a flow diagram illustrating one example of a process 800 for selecting a transmission power level based on a distance between a UE and an object within a transmission path from the UE. The process 800 may be performed by a wireless communication device, such as a UE (e.g., UE 115 of FIG. 1, device 205 of FIG. 2, device 302 of FIG. 3, device 402 of FIG. 4, or device 502 of FIG. 5). In some implementations, the features in the steps shown in process 800 may performed by one or more components of device 205 as described in FIG. 2. For example, each of the steps of process 800 may be performed by the processor 240 coupled with a memory that includes instructions executable by the processor to cause the apparatus (e.g., UE) to perform the recited processing steps. The process 800 of FIG. 8 may be a sub-portion of steps 610 and 612 of FIG. 6 when the UE determines whether an object is present within a transmission path from the UE and sets a communication parameter accordingly. For example, the distance estimation features of process 800 may be performed as a part of, or in combination with, the object detection features of step 610, and the power setting features of process 800 may be performed as a part of, or in combination with, the parameter setting features of step 612.

At step 802, the UE determines a distance between an object and the UE (or a component of the UE, such as an antenna or transceiver of the UE). For example, the UE may calculate an estimated distance according to the process described above in connection with step 704.

At step 804, the UE compares the estimated distance to a first distance threshold. If the estimated distance is less than the first threshold, then step 804 proceeds to step 806 and the UE selects a first power level for an upcoming transmission. The first power level may represent a power level that has been reduced relative to a baseline power level due to the estimated distance and an exposure limit (e.g., MPE limit). The baseline power level may represent a power level that the UE would select for the transmission if it were not for the exposure limits. As one example, the baseline power level may be a maximum power level allowed by governing or standardization groups (e.g., FCC, 3GPP, etc.) for this type of transmission. As another example, the baseline power level may be a non-maximum power level the UE would select for the transmission to meet various performance and power savings goals without consideration for exposure limits (e.g., MPE).

Alternatively, if the estimated distance is greater than the first threshold at step 804, then step 804 proceeds to step 808 and the UE compares the estimated distance to a second distance threshold. The second distance threshold is higher than the first distance threshold.

If the estimated distance is greater than the second threshold at step 808, then step 808 proceeds to step 810 and the UE selects a second power level for an upcoming transmission. The second power level is higher than the first power level. The second power level may represent a power level that has not been reduced relative to the baseline power level due to the distance and an exposure limit, such as an MPE limit. The baseline power level is further described in connection with step 806. At step 810, the UE has determined that the estimated distance is greater than the higher (second) threshold and thus even a transmission at the baseline power level would not violate the exposure limits. In this situation, the UE decides to not reduce power based on the exposure limit and the distance between the UE and the closest object.

Alternatively, if the estimated distance is less than the second threshold at step 808, then step 808 proceeds to step 812 and the UE selects a power level for an upcoming transmission that is somewhere between the first power level (e.g., the low power level that ensures exposure limit compliance) and the second power level (e.g., the baseline power level). The power level selected at step 812 may be above the first power level described above and below the second power level described above based on the distance being greater than the first distance threshold and less than the second distance threshold. The power level selected at step 812 may be any value between the first power level and the second power level, and may be selected directly as a function of the distance (e.g., a linear relationship between distance and power, or a look up table keyed to the distance) or may be stepped based on a comparison of the distance with one or more additional thresholds defined between the first threshold of step 804 and the second threshold of step 808.

Figure 9:
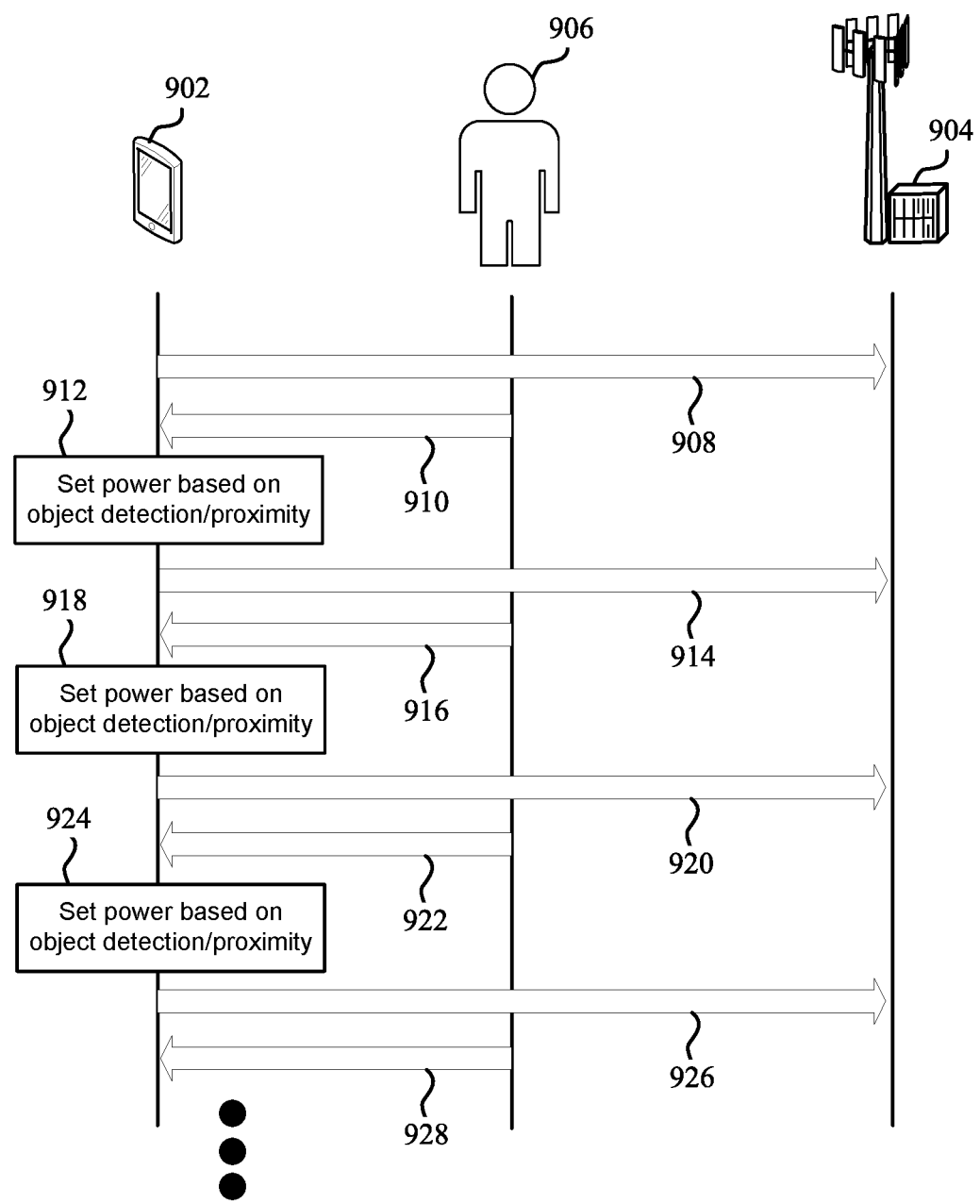
FIG. 9 is a message sequence diagram illustrating one example of a technique for setting a transmission power level based on an object detection process.

FIG. 9 is a message sequence diagram illustrating one example of a technique for setting a transmission power level based on an object detection process. The operations of FIG. 9 may be performed by a wireless communication device 902, such as a UE (e.g., UE 115 of FIG. 1, device 205 of FIG. 2, device 302 of FIG. 3, device 402 of FIG. 4, or device 502 of FIG. 5). In some implementations, the features shown in FIG. 9 may performed by one or more components of device 205 as described in FIG. 2. For example, the processing steps in FIG. 9 may be performed by the processor 240 coupled with a memory that includes instructions executable by the processor to cause the apparatus (e.g., UE) to perform the recited processing step. As another example, the transmission and reception steps in FIG. 9 may be performed by a combination of one or more of the processor 240, transceiver 220, and antenna 225 (among other components along the transmit and receive radio frequency chains of the device).

The message sequence diagram shown in FIG. 9 shows communication between a UE 902 communicating with a base station 904. For the example sequence in FIG. 9, an object 906 is present within a transmission path between the UE 902 and the base station 904. The object 906 may be a human. In the example of FIG. 9, as will be described in more detail below, the distance between the UE 902 and the object 906 may vary over time resulting in selection of different transmission parameters by the UE 902 over time as a result of the varying distance. The message sequence of FIG. 9 begins at a point when the UE 902 and the base station 904 have already established communication and have already selected a communication path (e.g., signal transmission path) between the devices. As one example where the devices are using mmW communications, the UE 902 and the base station 904 have already completed any beamforming and beam selection processing.

Once the beam selection and other set up processing is complete, the UE 902 and the base station 904 are ready to send uplink and downlink communications. In the example of FIG. 9, the UE 902 may transmit an initial uplink signal 908 intended for the base station 904. The initial uplink signal 908 comprises one or more of uplink user data, uplink control information, or uplink signaling. For example, the initial uplink signal 908 comprises at least one of a PUCCH, a PUSCH, a PRACH, or an SRS. In one example, the signal 908 is the first uplink message sent from the UE 902 to the base station 904 on the particular selected communication path (e.g., beam). In this situation, the UE 902 may choose to select a relatively low transmission power for the initial uplink signal 908 because the UE 902 may not have any information yet regarding the presence or proximity of any objects within the selected communication path. In one example, the UE 902 may select a minimum transmission power level. In another example, the UE 902 may select a transmission power level that has been determined to satisfy exposure limits (e.g., MPE) regardless of the distance between the UE 902 and the nearest human tissue.

Due to the object 906 being located within the transmission path of the uplink signal 908, at least a portion of the energy from the uplink signal 908 may be reflected back to the UE 902 in the form of reflected signal 910. The UE 902 will then analyze the reflected signal, as described above in connection with FIGS. 6-8 (as one example), to determine whether an object is present within the transmission path and to estimate a distance between the UE 902 and a nearest objected that caused the reflected signal 910 to return to the UE 902. In the example of FIG. 9, the UE 902 may determine that the object is relatively close to the UE 902 (e.g., the estimated distance is below the first threshold from step 804 of FIG. 8). In this situation, the UE 902 sets the power level relatively low at step 912 for the next uplink transmission opportunity. For example, the UE 902 may keep the transmission power level at the same level used for the initial uplink signal 908 to avoid exposure limit violations.

At the next uplink transmission opportunity, the UE 902 sends uplink signal 914 intended for the base station 904. Similar to the uplink signal 908, the uplink signal 914 comprises one or more of uplink user data, uplink control information, or uplink signaling. For example, the uplink signal 914 comprises at least one of a PUCCH, a PUSCH, a PRACH, or an SRS. At this point in time in the example of FIG. 9, the object 906 is still within the transmission path between the UE 902 and the base station 904 but is not as close to the UE 902 as it was when the UE 902 sent the initial uplink signal 908. Due to the continued presence of the object 906 in the transmission path, the object causes a reflected signal 916 to return back to the UE 902. The UE 902 will then analyze the reflected signal 916, as described above in connection with FIGS. 6-8 (as one example), to determine whether an object is present within the transmission path and to estimate a distance between the UE 902 and a nearest objected that caused the reflected signal 916 to return to the UE 902.

In the example of FIG. 9, the UE 902 may determine that the object is further away from the UE 902 than before but that exposure limits may still apply for an object proximity in the detected range (e.g., the estimated distance is above the first threshold from step 804 of FIG. 8, but below the second threshold from step 808 of FIG. 8). In this situation, the UE 902 may choose to increase the transmission power level for the next uplink transmission opportunity at step 918 to be above the power level used for the uplink signals 908 and 914. For example, now that the object is further from the UE 902, the UE 902 may increase the transmission power level above the level used for the initial uplink signal 908 to potentially increase the communication reliability (or cell coverage, or communication quality, etc.) while still complying with the relevant exposure limits.

At the next uplink transmission opportunity, the UE 902 sends uplink signal 920 intended for the base station 904. Similar to the uplink signals 908 and 914, the uplink signal 920 comprises uplink user data, uplink control information, or uplink signaling. For example, the uplink signal 914 comprises at least one of a PUCCH, a PUSCH, a PRACH, or an SRS. At this point in time in the example of FIG. 9, the object 906 may still be within the transmission path between the UE 902 and the base station 904 but is not as close to the UE 902 as it was when the UE 902 sent the uplink signal 914. Alternatively, the object may have moved outside of the transmission path altogether.

If the object 906 is still within the transmission path, the object 906 causes a reflected signal 922 to return back to the UE 902. If the object 906 has moved outside the transmission path, then the reflected signal 922 will not exist. The UE 902 will then analyze the reflected signal 922 (if received at all), as described above in connection with FIGS. 6-8 (as one example), to determine whether an object is present within the transmission path and to estimate a distance between the UE 902 and a nearest objected that caused the reflected signal 922 to return to the UE 902. If the reflected signal 922 does not exist, then the UE 902 may assume that no object is within the transmission path and/or that exposure limits may not apply to the next planned uplink transmission.

In the example of FIG. 9, the UE 902 may determine that the object 906 is further away from the UE 902 than it was for the last transmission and that exposure limits are not likely to be implicated by use of a transmission power that the UE 902 would use for the next transmission without considering exposure limits (e.g., either the reflected signal 922 does not exist, or the estimated distance based on the reflected signal 922 is above the second threshold from step 808 of FIG. 8). In this situation, the UE 902 may choose to increase the transmission power level for the next uplink transmission opportunity at step 924 to be above the power level used for the uplink signal 920. For example, the UE 902 may increase the transmission power level above the level used for the uplink signal 920 to potentially increase the communication reliability (or cell coverage, or communication quality, etc.) while still complying with the relevant exposure limits. In one example, the UE 902 may use the second power level (e.g., baseline power level) from step 810 of FIG. 8.

At the next uplink transmission opportunity, the UE 902 sends uplink signal 926 intended for the base station 904. Similar to the uplink signals 908, 914, and 920, the uplink signal 926 comprises one or more of uplink user data, uplink control information, or uplink signaling. For example, the uplink signal 914 comprises at least one of a PUCCH, a PUSCH, a PRACH, or an SRS. At this point in time in the example of FIG. 9, the object 906 may still be within the transmission path between the UE 902 and the base station 904. Alternatively, the object 906 may have moved out of the transmission path altogether. If the object remains in the path, then the object 906 will cause reflected signal 928 to return back to the UE 902. If the object is not present in the path, then reflected signal 928 will not exist. Although not shown in FIG. 9, the UE 902 will continue to send uplink signals towards the base station, analyze any received reflected signals for object detection and proximity purposes, and set uplink transmission power according to the object detection and proximity results to comply with exposure limits while attempting to meet other communication performance goals that would improve with higher transmission power when allowed based on the distance to the nearest object (e.g., human).

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable sub-combination. As such, although features may be described above as acting in particular combinations, and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on. Furthermore, although certain aspects may be described or claimed in the singular, the plural is contemplated unless limitation to the singular is explicitly stated.

What is claimed is:

1. A method of wireless communication, comprising:
   generating an uplink signal at a user equipment (UE), wherein the uplink signal comprises at least one of a physical uplink control channel (PUCCH), a physical uplink shared channel (PUSCH), or a physical random access channel (PRACH);
   transmitting the uplink signal from the UE;
   receiving a signal at the UE;
   performing a correlation between the transmitted uplink signal and the received signal;
   determining whether an object is present within a transmission path from the UE based on the correlation; and
   setting a transmission parameter at the UE based on the determination of whether the object is present within the transmission path.

2. The method of claim 1, wherein the uplink signal comprises the PUCCH.

3. The method of claim 1, wherein the uplink signal comprises the PUSCH.

4. The method of claim 1, wherein the uplink signal comprises the PRACH.

5. The method of claim 1, wherein the signal received at the UE is a reflected version of the PUCCH, PUSCH, or PRACH transmitted from the UE.

6. The method of claim 1, wherein performing the correlation comprises determining that the received signal is a reflected version of the transmitted uplink signal based on a comparison between a correlation threshold and a degree of correlation between the transmitted uplink signal and the received signal.

7. The method of claim 1, wherein setting the transmission parameter comprises setting a transmission power at the UE based on the determination of whether the object is present within the transmission path.

8. The method of claim 1, wherein the transmission path is a first transmission path, and wherein setting the transmission parameter comprises selecting a second transmission path, different than the first transmission path, for a next transmission from the UE based on a determination that the object is present within the first transmission path.

9. The method of claim 1, wherein determining whether the object is present within the transmission path comprises estimating a distance between the object and the UE, or a component of the UE, based on an amount of time between the transmission of the uplink signal and the reception of the received signal, and
wherein setting the transmission parameter comprises selecting a transmission power level for a second uplink signal based on the distance.

10. The method of claim 9, wherein selecting the transmission power level comprises:
comparing the distance to a distance threshold; and
selecting a first power level for the second uplink signal based on the distance being less than the distance threshold, wherein the first power level represents a power level that has been reduced relative to a baseline power level due to the distance and an exposure limit.

11. The method of claim 9, wherein selecting the transmission power level comprises:
comparing the distance to a distance threshold; and
selecting a second power level for the second uplink signal based on the distance being greater than the distance threshold, wherein the second power level represents a power level that has not been reduced relative to a baseline power level due to the distance and an exposure limit.

12. The method of claim 9, wherein selecting the transmission power level comprises:
comparing the distance to a first distance threshold and a second distance threshold; and
selecting a power level above a first power level and below a second power level for the second uplink signal based on the distance being greater than the first distance threshold and less than the second distance threshold;
wherein the first power level represents a power level that has been reduced relative to a baseline power level due to the distance and an exposure limit, and wherein the second power level represents a power level that has not been reduced relative to the baseline power level due to the distance and the exposure limit.

13. The method of claim 1, wherein transmitting the uplink signal comprises transmitting the uplink signal from a first antenna or antenna array of the UE, and wherein receiving the signal comprises receiving the signal at the first antenna or antenna array of the UE.

14. The method of claim 1, wherein transmitting the uplink signal comprises transmitting the uplink signal from a first antenna or antenna array of the UE, and wherein receiving the signal comprises receiving the signal at a second antenna or antenna array of the UE that is different than the first antenna or antenna array.

15. The method of claim 1, wherein the uplink signal is a millimeter wave signal transmitted on a beam from an antenna or antenna array of the UE, and wherein setting the transmission parameter comprises selecting a transmission power level for a second millimeter wave signal to be transmitted on the beam from the antenna or antenna array based on a maximum permissible exposure (MPE) limit and a determination that the object is present within the transmission path.

16. A user equipment (UE) for wireless communication, comprising:
a processor; and
a memory coupled with the processor, wherein the memory includes instructions executable by the processor to cause the UE to:
generate an uplink signal at the UE, wherein the uplink signal comprises at least one of a physical uplink control channel (PUCCH), a physical uplink shared channel (PUSCH), or a physical random access channel (PRACH);
transmit the uplink signal from the UE;
receive a signal at the UE;
perform a correlation between the transmitted uplink signal and the received signal;
determine whether an object is present within a transmission path from the UE based on the correlation; and
set a transmission parameter at the UE based on the determination of whether the object is present within the transmission path.

17. The UE of claim 16, wherein the uplink signal comprises the PUCCH.

18. The UE of claim 16, wherein the uplink signal comprises the PUSCH.

19. The UE of claim 16, wherein the uplink signal comprises the PRACH.

20. The UE of claim 16, wherein the signal received at the UE is a reflected version of the PUCCH, PUSCH, or PRACH transmitted from the UE.

21. The UE of claim 16, wherein the instructions executable by the processor to cause the UE to perform the correlation comprise instructions executable by the processor to cause the UE to determine that the received signal is a reflected version of the transmitted uplink signal based on a comparison between a correlation threshold and a degree of correlation between the transmitted uplink signal and the received signal.

22. The UE of claim 16, wherein the instructions executable by the processor to cause the UE to set the transmission parameter comprise instructions executable by the processor to cause the UE to set a transmission power at the UE based on the determination of whether the object is present within the transmission path.

23. The UE of claim 16, wherein the transmission path is a first transmission path, and wherein the instructions executable by the processor to cause the UE to set the transmission parameter comprise instructions executable by the processor to cause the UE to select a second transmission path, different than the first transmission path, for a next transmission from the UE based on a determination that the object is present within the first transmission path.

24. The UE of claim 16, wherein the instructions executable by the processor to cause the UE to determine whether the object is present within the transmission path comprise instructions executable by the processor to cause the UE to estimate a distance between the object and the UE, or a component of the UE, based on an amount of time between the transmission of the uplink signal and the reception of the received signal, and
wherein the instructions executable by the processor to cause the UE to set the transmission parameter comprise instructions executable by the processor to cause the UE to select a transmission power level for a second uplink signal based on the distance.

25. The UE of claim 24, wherein the instructions executable by the processor to cause the UE to select the transmission power level comprise instructions executable by the processor to cause the UE to:
compare the distance to a distance threshold; and
select a first power level for the second uplink signal based on the distance being less than the distance threshold, wherein the first power level represents a power level that has been reduced relative to a baseline power level due to the distance and an exposure limit.

26. The UE of claim 24, wherein the instructions executable by the processor to cause the UE to select the transmission power level comprise instructions executable by the processor to cause the UE to:
compare the distance to a distance threshold; and
select a second power level for the second uplink signal based on the distance being greater than the distance threshold, wherein the second power level represents a power level that has not been reduced relative to a baseline power level due to the distance and an exposure limit.

27. The UE of claim 24, wherein the instructions executable by the processor to cause the UE to select the transmission power level comprise instructions executable by the processor to cause the UE to:
compare the distance to a first distance threshold and a second distance threshold; and
select a power level above a first power level and below a second power level for the second uplink signal based on the distance being greater than the first distance threshold and less than the second distance threshold;
wherein the first power level represents a power level that has been reduced relative to a baseline power level due to the distance and an exposure limit, and wherein the second power level represents a power level that has not been reduced relative to the baseline power level due to the distance and the exposure limit.

28. A user equipment (UE) for wireless communication, comprising:
means for generating an uplink signal at a user equipment (UE), wherein the uplink signal comprises at least one of a physical uplink control channel (PUCCH), a physical uplink shared channel (PUSCH), or a physical random access channel (PRACH);
means for transmitting the uplink signal from the UE;
means for receiving a signal at the UE;
means for performing a correlation between the transmitted uplink signal and the received signal;
means for determining whether an object is present within a transmission path from the UE based on the correlation; and
means for setting a transmission parameter at the UE based on the determination of whether the object is present within the transmission path.

* * * * *